(12) United States Patent
Sadek et al.

(10) Patent No.: US 7,894,331 B2
(45) Date of Patent: Feb. 22, 2011

(54) ADAPTIVE TIME-DOMAIN INTERPOLATION FOR OFDM SCATTERED PILOT SYMBOLS

(75) Inventors: Mirette Sadek, Heliopolis (EG); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 839 days.

(21) Appl. No.: 11/850,180

(22) Filed: Sep. 5, 2007

(65) Prior Publication Data

US 2009/0059885 A1 Mar. 5, 2009

(51) Int. Cl.
*H04J 11/00* (2006.01)
*H04K 1/10* (2006.01)
*H04B 7/216* (2006.01)

(52) U.S. Cl. .................. 370/210; 370/342; 375/260

(58) Field of Classification Search .................. None
See application file for complete search history.

(56) References Cited

U.S. PATENT DOCUMENTS

| 7,440,506 | B2 | 10/2008 | Atungsiri et al. | |
| 7,577,087 | B2* | 8/2009 | Palin | 370/210 |
| 2005/0213679 | A1* | 9/2005 | Yamagata | 375/260 |
| 2005/0213680 | A1* | 9/2005 | Atungsiri et al. | 375/260 |
| 2006/0269016 | A1 | 11/2006 | Long et al. | |
| 2007/0201571 | A1* | 8/2007 | Isson et al. | 375/260 |
| 2007/0230601 | A1 | 10/2007 | Yim et al. | |
| 2008/0084817 | A1* | 4/2008 | Beckman et al. | 370/210 |

FOREIGN PATENT DOCUMENTS

EP 1821407 A1 * 8/2007

OTHER PUBLICATIONS

Chen, Shiou-Hong et al., "Mode Detection, Synchronization, and Channel Estimation for DVB-T OFDM Receiver," IEEE Global Telecommunications Conference, 2003. GLOBECOM '03, Dec. 1-5, 2003, pp. 2416-2420.

\* cited by examiner

*Primary Examiner*—Steven H Nguyen
(74) *Attorney, Agent, or Firm*—Rahman LLC

(57) ABSTRACT

A receiver for use in a pilot-aided OFDM system and a method of performing channel length estimation of a channel in a wireless communication system includes using transmitted and received wireless signals to estimate a channel carrier function vector at continuous and scattered pilot positions of consecutive OFDM symbols; performing time-domain interpolation by (i) upsampling the estimated the channel carrier function vectors at the scattered pilot positions by inserting zeros in between estimated scattered pilot positions, and (ii) filtering the upsampled vectors using a finite impulse response filter comprising a filter bank comprising a plurality of filters; mapping the channel carrier function vector to only one of the filters in the filter bank located in the finite impulse response filter, wherein the mapping causes noise reduction and enhanced channel estimation thereby increasing a maximum Doppler frequency in the channel.

20 Claims, 8 Drawing Sheets

Time interpolation

ADAPTIVE TIME-DOMAIN INTERPOLATION FOR OFDM SCATTERED PILOT SYMBOLS

BACKGROUND

1. Technical Field

The embodiments herein generally relate to mobile television (TV) technologies, and, more particularly, to pilot-aided orthogonal-frequency-division-multiplexing (OFDM) systems.

2. Description of the Related Art

Frequency division multiplexed communications systems transmit upwards of thousands of carrier signals simultaneously to communicate information. In the case of OFDM systems the transmitted carrier signals are orthogonal to each other to avoid or minimize mutual interference. In an OFDM system, each transmitted carrier signal may be used to transmit a different unit of data (e.g., symbol) in parallel. In pilot-aided OFDM systems, carriers of the OFDM symbol are modulated, at the transmitter, with data symbols in addition to pilot symbols known to both the transmitter and the receiver. At the receiver, these pilots are used to estimate the channel at the corresponding carrier positions. The pilot positions are not necessarily fixed from one OFDM symbol to another. If the pilot position is fixed across the OFDM symbols, it is called a "continuous" pilot; if it is variable, it is called a "scattered" pilot. FIG. 1 shows an example of an OFDM symbol structure where there are both continuous and scattered pilots. In order to recover the entire channel (all the carriers) from the estimated carriers at the pilot positions, the estimated carriers are interpolated to obtain the entire channel.

For each transmitted carrier signal, an OFDM receiver attempts to compensate for the distortion induced by the transmission channel. Typically, this involves a channel estimation operation and a channel compensation operation. In order to assist a receiver in overcoming multipath distortion, pilot signals having known data patterns are transmitted. Moreover, the pilot signals are used to support channel estimation operations, which generally attempt to estimate the amplitude and phase distortion introduced by the communications channel. The pattern structure of the pilots can generally be in any pattern provided that the Nyquist sampling criteria for the communication channel's impulse response and rate of change are satisfied. Furthermore, the number of pilots transmitted is often a function of the expected multipath distortion delay and the anticipated rate of change in channel conditions. However, it is desirable to minimize the number of pilots transmitted since the transmission of a pilot precludes the transmission of data in the transmission slot used to transmit the pilot.

The pilots represented in FIG. 1 are distributed in the frequency domain and the time domain. As shown in FIG. 1, there are symbol transmission periods during which no pilots are transmitted or received. Furthermore, the received known pilot signals are used to estimate the channel distortion at the time and frequency of each pilot. For each OFDM transmitted carrier signal a channel estimate is typically required for channel compensation purposes. Thus, where no pilots are located, a channel estimate has to be generated. Pilots for these frequency/time slots may be generated using interpolation on the received pilots in the time and/or frequency domain. Moreover, the pilot interpolation can be performed using a number of known techniques. For example, one can perform a simple linear interpolation between pilot data points or more sophisticated cubic interpolation. Alternatively, one may simply fill in the gaps between pilot bins by performing a low pass filter (LPF) operation on the received pilot data points. In this context, a "bin" represents data or a set of data corresponding to an individual carrier frequency.

Unfortunately even with pilots spaced sufficiently close enough in the frequency and time domains to meet the channel's Nyquist criterion, filling in the channel estimate between the known pilot bins may still be prone to error due to additive noise. Conventional channel estimation techniques attempt to solve this problem in the following manner. The OFDM symbols are received, the pilots are extracted, then averaged over many OFDM symbols. Then, once sufficient averaging in performed providing a reduction in noise corruption, the channel is interpolated between the pilots. After this, the received signal on a given channel is multiplied by the inverse of the corresponding channel estimate in an attempt to remove multipath and/or other distortion introduced by the communications channel. This technique works well except that it depends on a relatively long integration time to reduce the noise corruption. Accordingly, this delay is undesirable since it increases the time between when a carrier recovery signal lock is first achieved and when received symbols may be decoded in a reliable manner. Therefore, there remains a need for a new interpolation technique for OFDM scattered pilots.

SUMMARY

In view of the foregoing, an embodiment provides a method of performing channel length estimation of a channel in a wireless communication system and a program storage device readable by computer comprising a program of instructions executable by the computer to perform the method comprising using transmitted and received wireless signals to estimate a channel carrier function vector at continuous and scattered pilot positions of consecutive OFDM symbols; performing time-domain interpolation by (i) upsampling the estimated the channel carrier function vectors at the scattered pilot positions by inserting zeros in between estimated scattered pilot positions, and (ii) filtering the upsampled vectors using a finite impulse response filter comprising a filter bank comprising a plurality of filters; and mapping the channel carrier function vector to only one of the filters in the filter bank located in the finite impulse response filter, wherein the mapping causes noise reduction and enhanced channel estimation thereby increasing a maximum Doppler frequency in the channel.

Preferably, the filters comprise an all-pass filter and a set of low pass filters. Moreover, the all-pass filter may be used for a short channel having a maximum delay spread less than 9.3 μsec and having a Doppler frequency exceeding a Nyquist frequency. Furthermore, the low pass filters may be used for a long channel having a maximum delay spread greater than 9.3 μsec. Additionally, the filtering increases a Doppler frequency associated with the channel. Also, the filtering filters out-of-band noise from the channel. Preferably, the upsampling and the filtering comprise buffering the consecutive OFDM symbols.

Another embodiment provides a receiver for use in a pilot-aided OFDM system, wherein the receiver comprises is adapted to perform channel length estimation of a channel in a wireless communication system, wherein the receiver comprises a Fast Fourier Transform (FFT) module adapted to use wireless signals to estimate a channel carrier function vector at continuous and scattered pilot positions of consecutive OFDM symbols; a time-domain interpolator adapted to upsample the estimated the channel carrier function vectors at the scattered pilot positions by inserting zeros in between estimated scattered pilot positions, and filter the upsampled vectors using a finite impulse response filter comprising a filter bank comprising a plurality of filters; and a channel mapper adapted to map the channel carrier function vector to only one of the filters in the filter bank located in the finite impulse response filter, wherein the mapping causes the time-domain interpolation to achieve noise reduction and enhanced channel estimation thereby increasing a maximum Doppler frequency in the channel.

Preferably, the filters comprise an all-pass filter and a set of low pass filters. Furthermore, the all-pass filter may be used for a short channel having a maximum delay spread less than 9.3 μsec and having a Doppler frequency exceeding a Nyquist frequency. Additionally, the low pass filters may be used for a long channel having a maximum delay spread greater than 9.3 μsec. Also, the filter increases the supported Doppler frequency associated with the channel, and wherein the filter filters out-of-band noise from the channel. Moreover, the time-domain interpolator is adapted to buffer the consecutive OFDM symbols.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
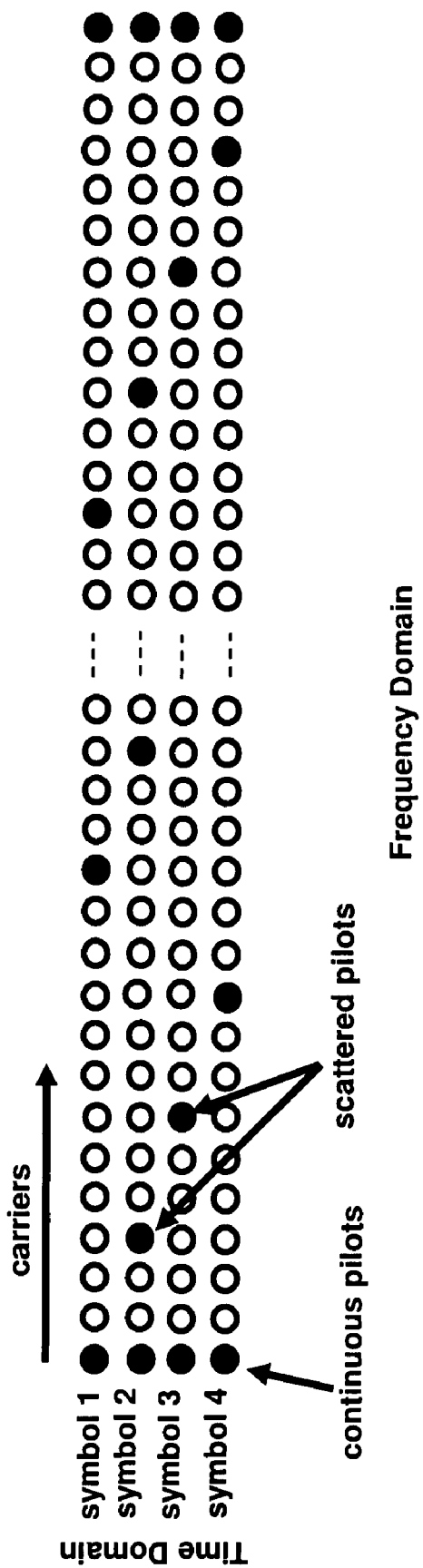
FIG. 1 illustrates a schematic diagram of a pilot-aided OFDM symbol structure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new interpolation technique for OFDM scattered pilots. The embodiments herein achieve this by providing an adaptive time-domain interpolator for OFDM scattered pilots. Referring now to the drawings, and more particularly to FIGS. 2 through 7, where similar reference characters denote corresponding features consistently throughout the figures, there are shown preferred embodiments.

The spacing between pilots in one OFDM symbol dictates the maximum recoverable channel length in the time-domain. For example, in the Digital Video Broadcasting—Handheld (DVB-H) system, the spacing between the pilots is 12 carriers. According to the well-known Nyquist stability criterion, this allows for a recovered channel impulse response of length $1/(2*12*\Delta f)$. In the 2 k mode, this results in a maximum delay spread of approximately 9.3 μsec. Similarly, in the Media FLO™ communications systems, the carrier spacing is 1 out of 8 which results in a certain maximum delay spread recovered.

In order to increase the maximum recoverable delay spread, the carriers are first interpolated along the time access (across OFDM symbols) to give 1 carrier out of 3, in the case of DVB-H, and 1 carrier out of 4, in the case of MediaFLO™ systems. This quadruples and doubles the maximum delay spreads respectively.

Figure 2:
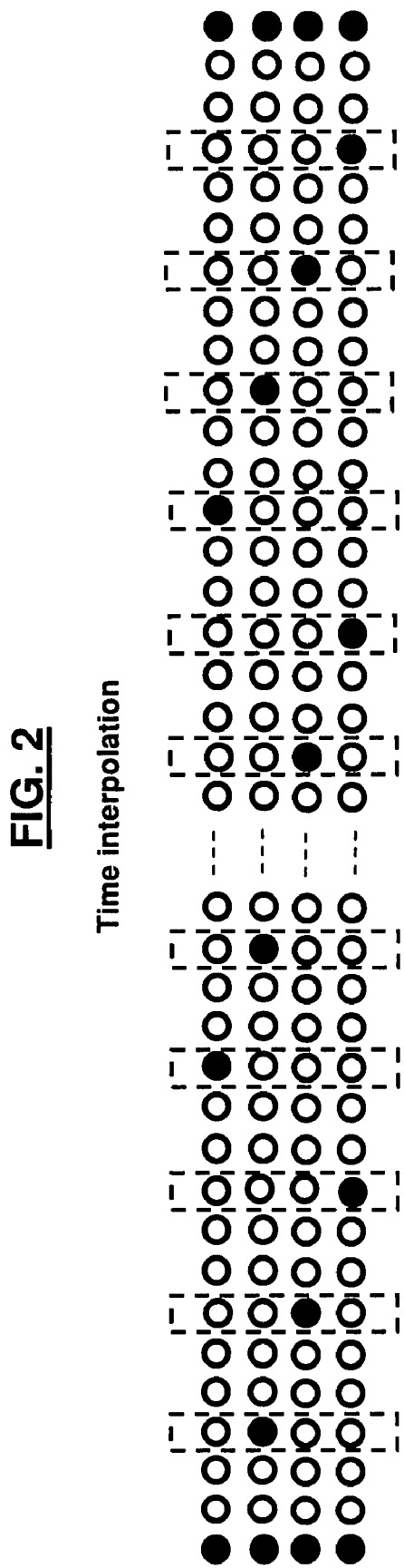
FIG. 2 illustrates a schematic diagram of the time-domain interpolation of consecutive OFDM data symbols according to an embodiment herein.

The time-domain interpolation is completed in two steps: (1) Upsampling the estimated carriers at the pilot positions by inserting zeros in between the estimated scattered pilots. (2) Low pass filtering the upsampled vectors using a finite impulse response low-pass filter (FIR LPF). Upsampling and low pass filtering requires buffering of consecutive OFDM symbols. FIG. 2 shows the time-domain interpolation.

Along the time axis; i.e., across consecutive OFDM symbols, each carrier is recovered using 1 out of n samples. For example, in the case of DVB-H, n=4 samples. This means that the sampling frequency along the time axis is $1/(4*T\_sym)$, where T_sym is the OFDM symbol duration. Thus, according to the Nyquist stability criterion, the maximum frequency of variation for each carrier is $1/(2*4*T\_sym)$. For the 2 k mode with guard ¼, this means the maximum allowable Doppler is 446.4 Hz. If the Doppler frequency exceeds this value, aliasing occurs and the output of the time interpolation filter is incorrect. This means that at high Doppler frequencies, the receiver performance is limited by the performance of the time interpolator. On the other hand, at Doppler frequencies less than the maximum allowable, regular interpolation involves using a low pass filter with a fixed cutoff frequency ($=1/(2*N*T\_sym)$, where N is the upsampling rate). In case of low Doppler frequencies, this means that the low pass filter passes unnecessary out-of-band noise. Thus, adaptation of the low pass filter to the Doppler frequency of the channel results in better performance. The performance is notably better using the filter adaptation technique provided by the embodiments herein as opposed to the fixed filter, especially for low Doppler, high noise scenarios.

Figure 3:
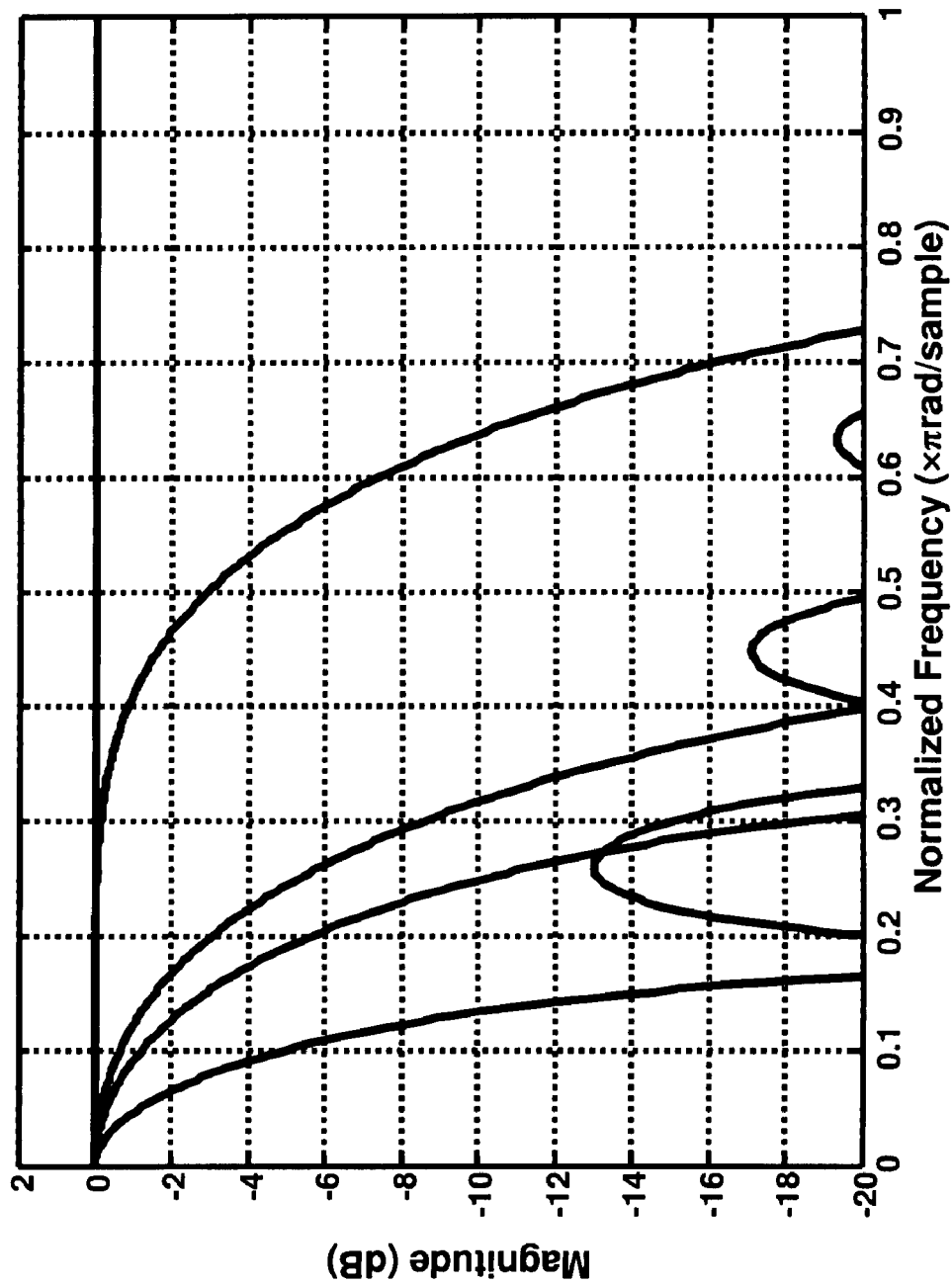
FIG. 3 is a graphical representation illustrating the magnitude response of a time-domain interpolation filter bank according to an embodiment herein.

The embodiments herein provide for mapping the channel Doppler frequency to one of the filters in a filter bank in a time-domain interpolator. The frequency responses of the filters in the bank are shown in FIG. 3. The mapping process is completed in two steps: (1) estimating the Doppler frequency of the channel, and (2) choosing the filter that has the minimum cutoff among all the filters whose cutoffs are greater than the Doppler frequency of the channel. The method of estimating the Doppler frequency may be performed by any known method.

Figure 4:
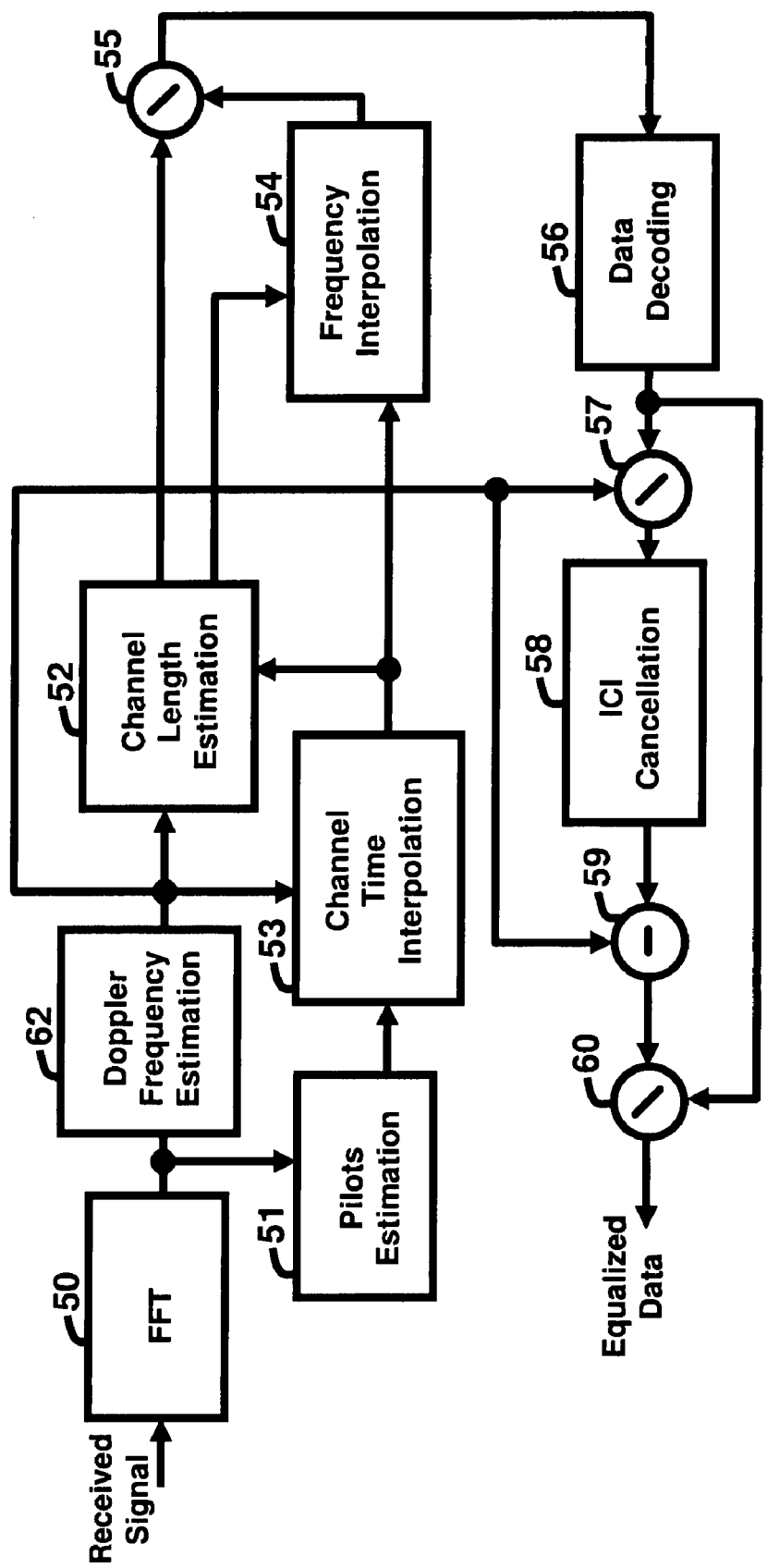
FIG. 4 illustrates a schematic diagram of a receiver block diagram with a modified time-domain interpolator according to an embodiment herein.

The receiver block diagram is shown in FIG. 4. Using the adaptive time interpolator provided by the embodiments herein can result in an increase of up to 20% in the maximum attainable Doppler frequency. This is possible because at high Doppler frequencies, the channel is mapped to the widest filter in the bank (an all-pass filter) that does not low-pass-filter the Doppler spectrum of the channel and then the channel is entirely interpolated in the frequency domain. This works for channels with small delay spreads (9.3 μsec or less in case of the DVB-H, 2 k mode.

After performing an N-point fast Fourier transform (FFT) (50) on the received signal, the channel is estimated (51) at the pilot positions. This occurs by dividing the received signal at the pilot positions by the pilots. This estimated channel is used for Doppler frequency estimation (62) which uses conventional Doppler frequency estimation algorithms. The channel is then interpolated (53) in the time domain by upsampling the channel then low pass filtering. The time-interpolated channel is used to estimate (52) the channel length using a conventional channel length estimation algorithm and is then interpolated (54) in the frequency domain by inserting zeros and low pass filtering. Finally, the received signal is divided (55) by the estimated channel to obtain the data samples at all positions. The next stage is inter-carrier interference (ICI) cancellation. The equalized data (output from step (55)) is decoded (56) (using a Viterbi decoder in case of a DVB-H system). The received signal is divided (57) by the decoded (and re-encoded) data symbols to obtain a corrected version of the channel. The corrected channel is then processed by the ICI cancellation block (58) that calculates the first order variations of the channel and hence the ICI term. The ICI term is then subtracted (59) from the received signal and the output is a signal that is almost ICI-free. This ICI-free signal is then divided (60) by the corrected channel to obtain the final equalized data symbols.

Figure 5:
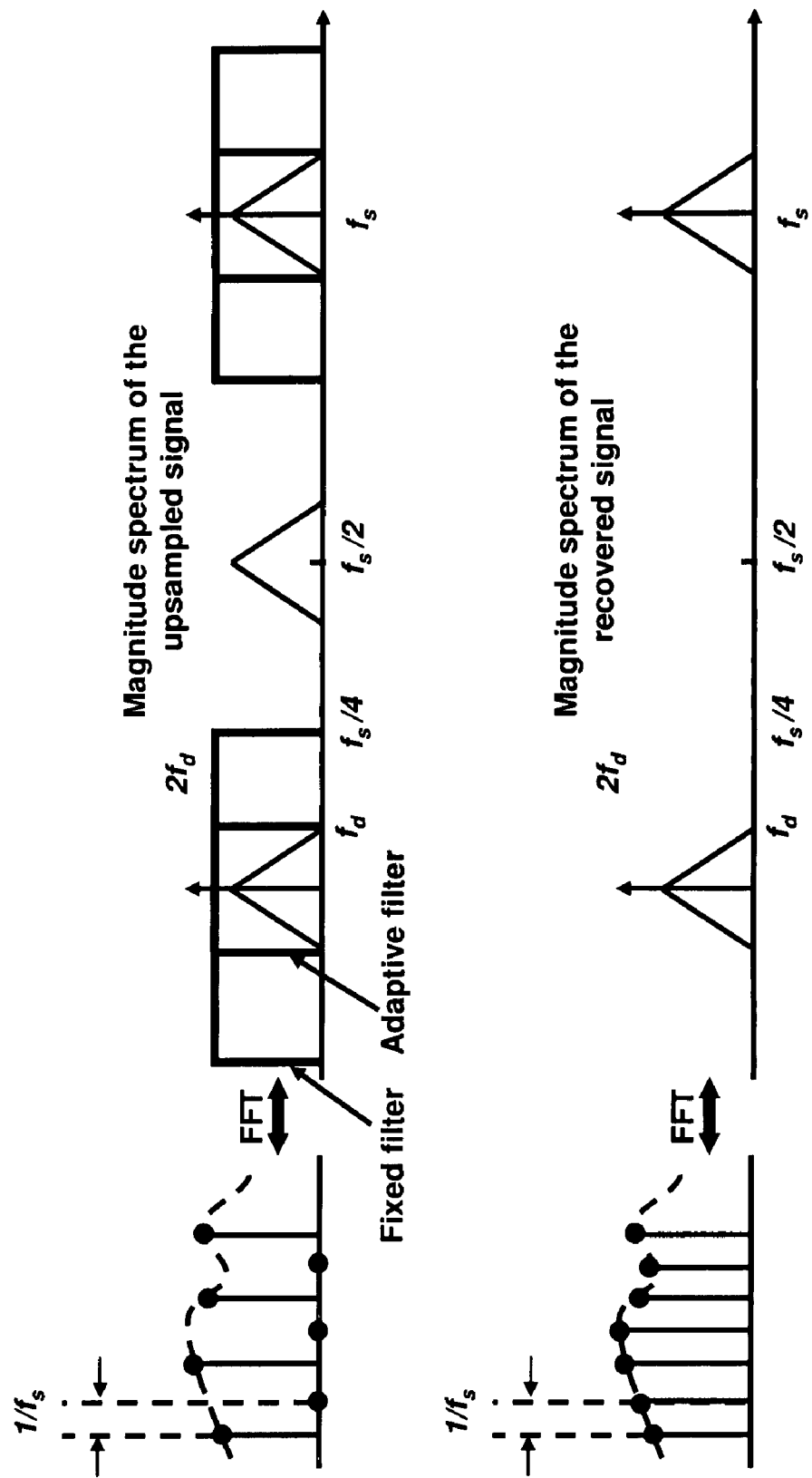
FIG. 5 is a graphical representation illustrating the magnitude spectra for a downsampled signal, and a recovered signal according to the embodiments herein.

FIG. 5 illustrates the frequency adaptation of the time filter. This figure shows the effect of the upsampling process on the signal spectrum; i.e., creating aliases around half of the sampling frequency ($f_s/2$). The interpolation process is completed by low pass filtering to recover the original signal and rejecting the aliases.

Figure 6:
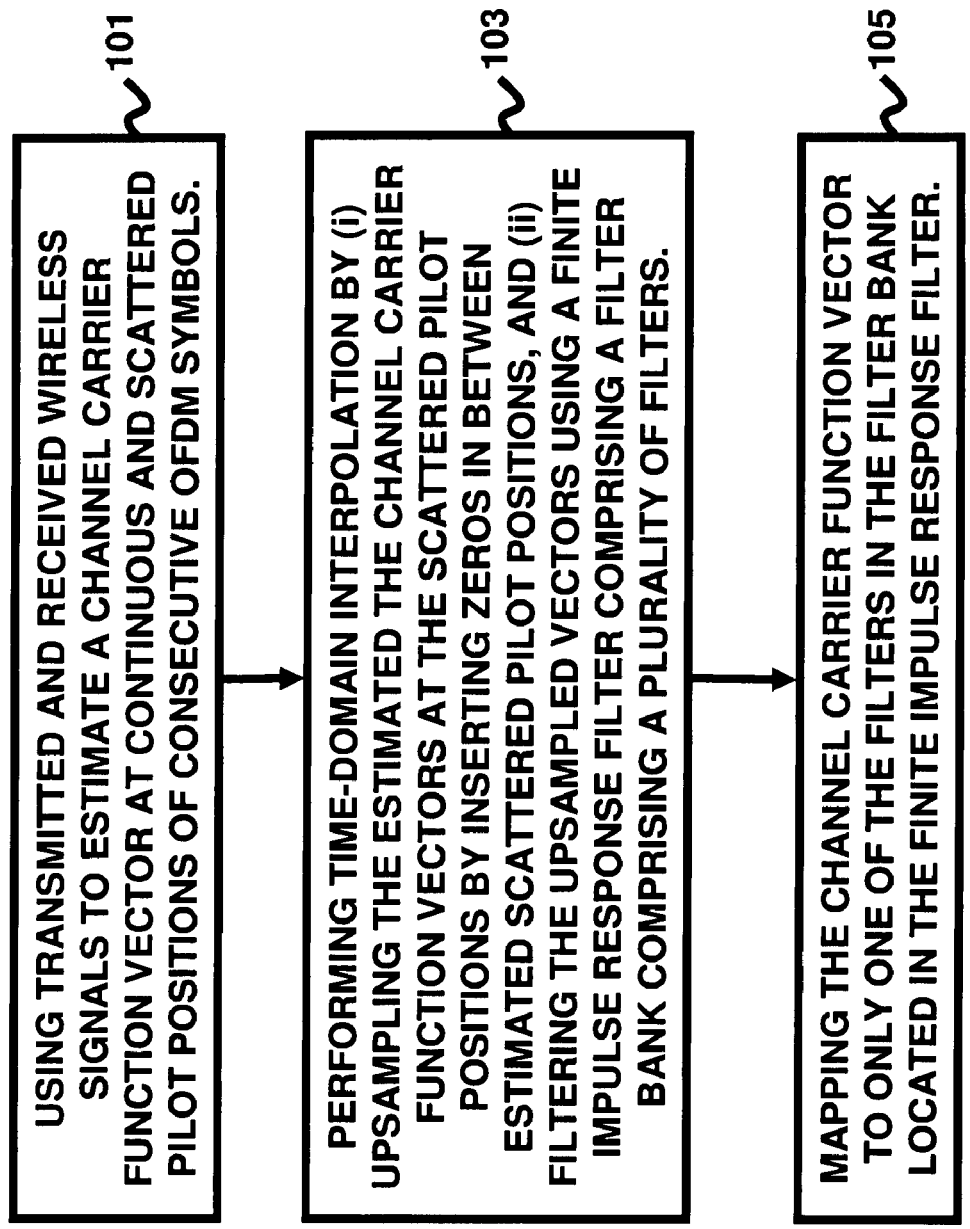
FIG. 6 is a flow diagram illustrating a preferred method according to an embodiment herein.

FIG. 6 is a flow diagram illustrating a method of performing channel length estimation of a channel in a wireless communication system according to an embodiment herein, wherein the method comprises using (101) transmitted and received wireless signals to estimate a channel carrier function vector at continuous and scattered pilot positions of consecutive OFDM symbols; performing (103) time-domain interpolation by (i) upsampling the estimated the channel carrier function vectors at the scattered pilot positions by inserting zeros in between estimated scattered pilot positions, and (ii) filtering the upsampled vectors using a finite impulse response filter comprising a filter bank comprising a plurality of filters; and mapping (105) the channel carrier function vector to only one of the filters in the filter bank located in the finite impulse response filter, wherein the mapping causes noise reduction and enhanced channel estimation thereby increasing a maximum Doppler frequency in the channel.

Preferably, the filters comprise an all-pass filter and a set of low pass filters. Moreover, the all-pass filter may be used for a short channel having a maximum delay spread less than 9.3 μsec and having a Doppler frequency exceeding a Nyquist frequency. Furthermore, the low pass filters may be used for a long channel having a maximum delay spread greater than 9.3 μsec. Additionally, the filtering increases a Doppler frequency associated with the channel. Also, the filtering filters out-of-band noise from the channel. Preferably, the upsampling and the filtering comprise buffering the consecutive OFDM symbols.

The techniques provided by the embodiments herein may be implemented on an integrated circuit chip (not shown) and may be used in digital video broadcast systems for handheld devices, and implemented in the baseband chip sets. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
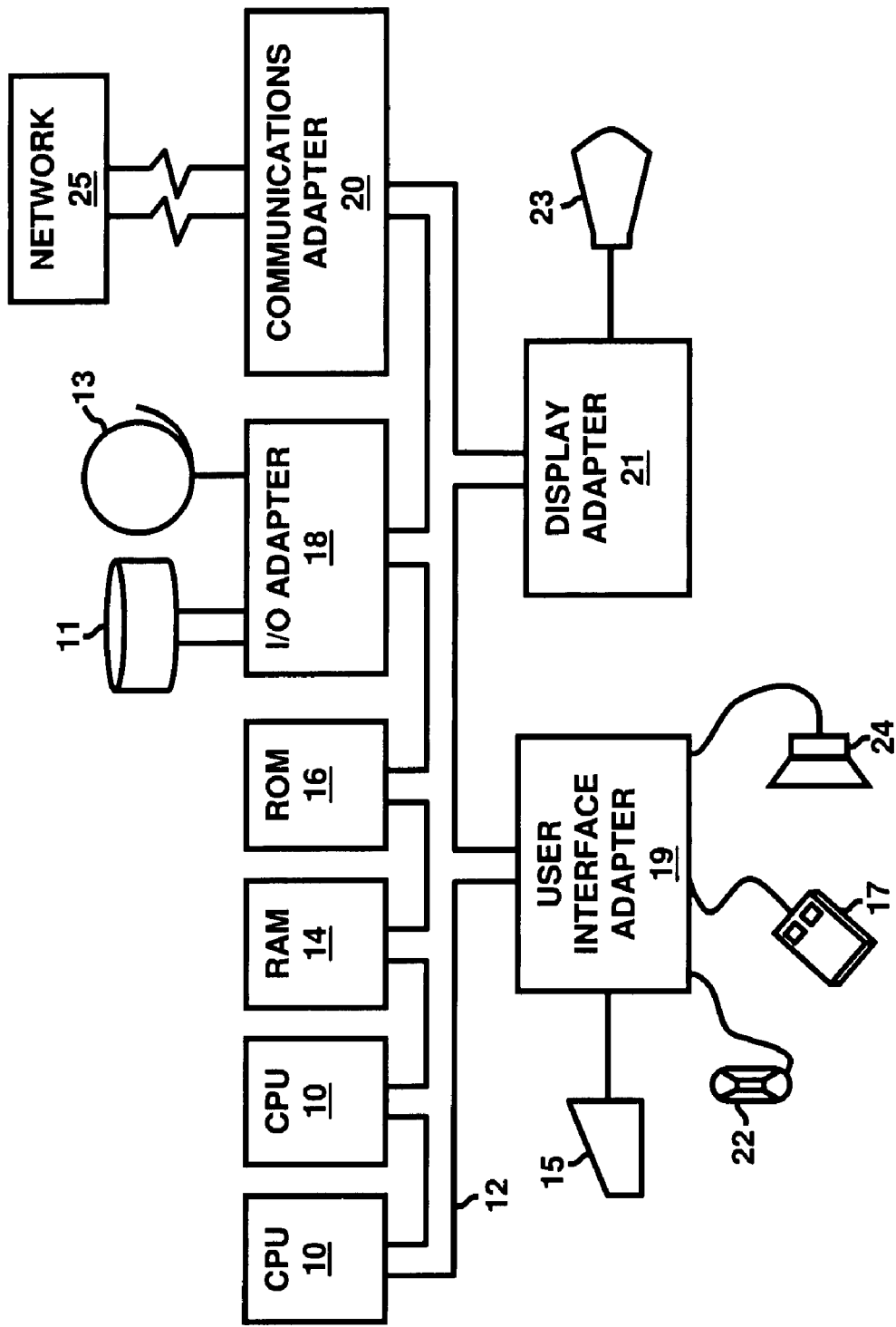
FIG. 7 illustrates a schematic diagram of a computer system according to an embodiment herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The technique afforded by the embodiments herein allows for the increase of the maximum Doppler frequency supported by removing the time domain interpolator which otherwise limits the maximum Doppler frequency through aliasing. It also enhances the performance of noisy channels with low Doppler frequencies through adapting the time filter to the Doppler frequency thus filtering unnecessary out-of-band noise.

Figure 8:
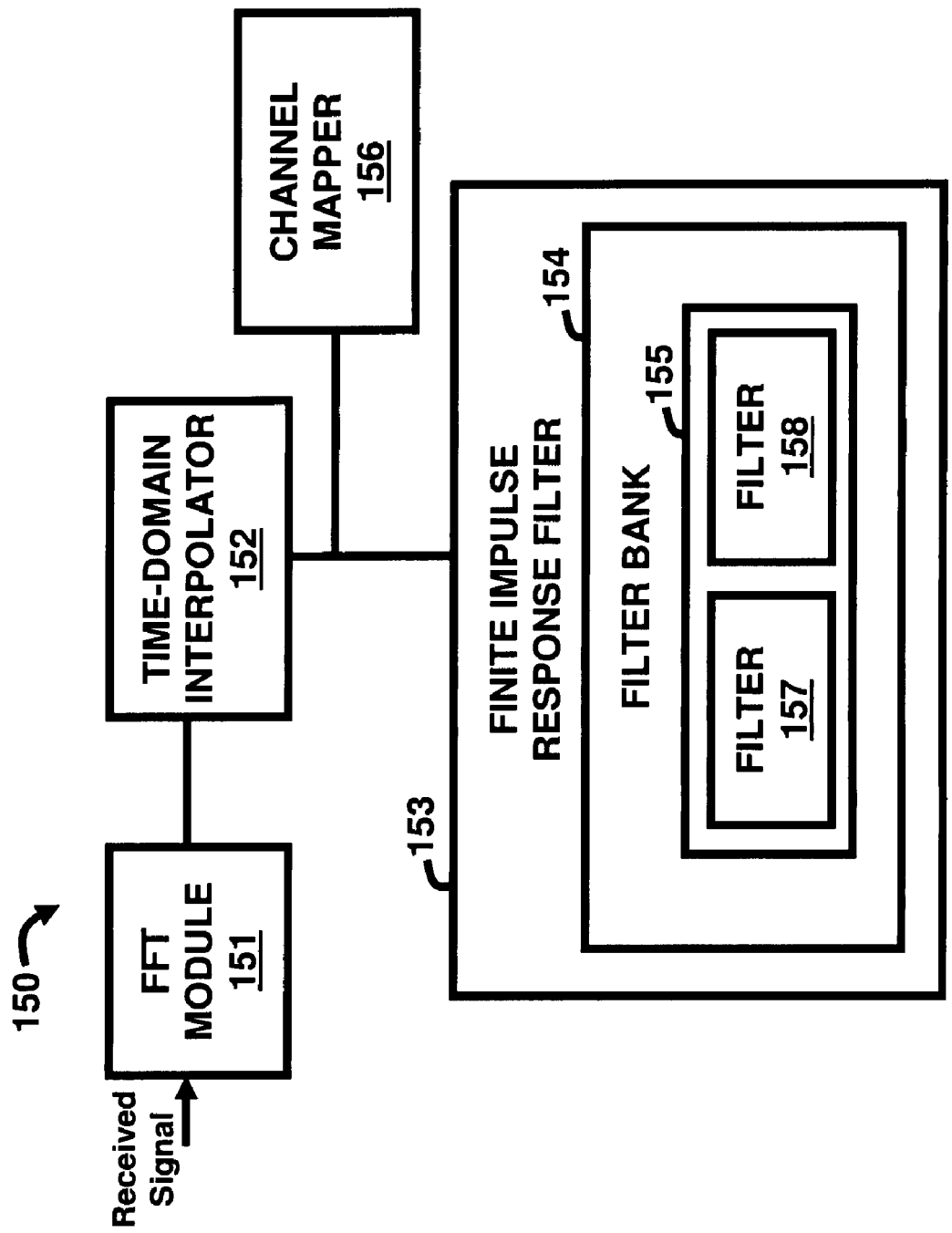
FIG. 8 illustrates a system block diagram of a receiver according to an embodiment herein.

FIG. 8 illustrates a system block diagram of a receiver 150 for use in a pilot-aided OFDM system. The receiver 150 is adapted to perform channel length estimation of a channel in a wireless communication system, wherein the receiver 150 comprises a FFT 151 module adapted to use wireless signals to estimate a channel carrier function vector at continuous and scattered pilot positions of consecutive OFDM symbols; a time-domain interpolator 152 adapted to upsample the estimated the channel carrier function vectors at the scattered pilot positions by inserting zeros in between estimated scattered pilot positions, and filter the upsampled vectors using a finite impulse response filter 153 comprising a filter bank 154 comprising a plurality of filters 155; and a channel mapper 156 adapted to map the channel carrier function vector to only one of the filters 155 in the filter bank 154 located in the finite impulse response filter 153, wherein the mapping causes the time-domain interpolation to achieve noise reduction and enhanced channel estimation thereby increasing a maximum Doppler frequency in the channel. Preferably, the filters 155 comprise an all-pass filter 157 and at least one low pass filter 158.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of performing channel length estimation of a channel in a wireless communication system, said method comprising:

using transmitted and received wireless signals to estimate a channel carrier function vector at continuous and scattered pilot positions of consecutive orthogonal-frequency-division-multiplexing (OFDM) symbols;

performing time-domain interpolation by (i) upsampling the estimated said channel carrier function vectors at said scattered pilot positions by inserting zeros in between estimated scattered pilot positions, and (ii) filtering the upsampled vectors using a finite impulse response filter comprising a filter bank comprising a plurality of filters; and mapping said channel carrier function vector to only one of said filters in said filter bank located in said finite impulse response filter, wherein said mapping causes noise reduction and enhanced channel estimation thereby increasing a maximum Doppler frequency in said channel.

2. The method of claim 1, wherein said filters comprise an all-pass filter and a set of low pass filters.

3. The method of claim 2, wherein said all-pass filter is used for a short channel having a maximum delay spread less than 9.3 μsec and having a Doppler frequency exceeding a Nyquist frequency.

4. The method of claim 2, wherein said low pass filters are used for a long channel having a maximum delay spread greater than 9.3 μsec.

5. The method of claim 1, wherein said filtering increases a Doppler frequency associated with said channel.

6. The method of claim 1, wherein said filtering filters out-of-band noise from said channel.

7. The method of claim 1, wherein said upsampling and said filtering comprise buffering said consecutive OFDM symbols.

8. A non-transitory program storage device readable by computer comprising a program of instructions executable by said computer to perform a method of performing channel length estimation of a channel in a wireless communication system, said method comprising:

using transmitted and received wireless signals to estimate a channel carrier function vector at continuous and scattered pilot positions of consecutive orthogonal-frequency-division-multiplexing (OFDM) symbols;

performing time-domain interpolation by (i) upsampling the estimated said channel carrier function vectors at said scattered pilot positions by inserting zeros in between estimated scattered pilot positions, and (ii) filtering the upsampled vectors using a finite impulse response filter comprising a filter bank comprising a plurality of filters; and mapping said channel carrier function vector to only one of said filters in said filter bank located in said finite impulse response filter, wherein said mapping causes noise reduction and enhanced channel estimation thereby increasing a maximum Doppler frequency in said channel.

9. The program storage device of claim 8, wherein said filters comprise an all-pass filter and a set of low pass filters.

10. The program storage device of claim 9, wherein said all-pass filter is used for a short channel having a maximum delay spread less than 9.3 µsec and having a Doppler frequency exceeding a Nyquist frequency.

11. The program storage device of claim 9, wherein said low pass filters are used for a long channel having a maximum delay spread greater than 9.3 µsec.

12. The program storage device of claim 8, wherein said filtering increases the maximum supported Doppler frequency associated with said channel.

13. The program storage device of claim 8, wherein said filtering filters out-of-band noise from said channel.

14. The program storage device of claim 8, wherein said upsampling and said filtering comprise buffering said consecutive OFDM symbols.

15. A receiver for use in a pilot-aided OFDM system, said receiver performing channel length estimation of a channel in a wireless communication system, wherein said receiver comprises:

a Fast Fourier Transform (FFT) module that uses wireless signals to estimate a channel carrier function vector at continuous and scattered pilot positions of consecutive orthogonal-frequency-division-multiplexing (OFDM) symbols;

a time-domain interpolator that upsamples the estimated said channel carrier function vectors at said scattered pilot positions by inserting zeros in between estimated scattered pilot positions, and filter the upsampled vectors using a finite impulse response filter comprising a filter bank comprising a plurality of filters; and a channel mapper that maps said channel carrier function vector to only one of said filters in said filter bank located in said finite impulse response filter, wherein said mapping causes said time-domain interpolation to achieve noise reduction and enhanced channel estimation thereby increasing a maximum Doppler frequency in said channel.

16. The receiver of claim 15, wherein said filters comprise an all-pass filter and a set of low pass filters.

17. The receiver of claim 16, wherein said all-pass filter is used for a short channel having a maximum delay spread less than 9.3 µsec and having a Doppler frequency exceeding a Nyquist frequency.

18. The receiver of claim 16, wherein said low pass filters are used for a long channel having a maximum delay spread greater than 9.3 µsec.

19. The receiver of claim 15, wherein said filter increases the supported Doppler frequency associated with said channel, and wherein said filter filters out-of-band noise from said channel.

20. The receiver of claim 15, wherein said time-domain interpolator buffers said consecutive OFDM symbols.

* * * * *